United States Patent [19]

Hosoya et al.

[11] Patent Number: 4,910,771
[45] Date of Patent: Mar. 20, 1990

[54] TELEVISION SIGNAL CONVERTER

[75] Inventors: Nobukazu Hosoya, Nara; Takeshi Higashino, Daito; Yoshichika Hirao, Neyagawa; Toru Sasaki, Matsubara, all of Japan

[73] Assignee: Sanyo Electric Co., Ltd., Moriguchi, Japan

[21] Appl. No.: 383,270

[22] Filed: Jul. 19, 1989

Related U.S. Application Data

[63] Continuation of Ser. No. 926,613, Nov. 4, 1986, abandoned.

[30] Foreign Application Priority Data

Nov. 5, 1985 [JP] Japan ............... 60-170006[U]

[51] Int. Cl.⁴ .............................................. H04N 7/167
[52] U.S. Cl. ........................................ 380/15; 380/13; 380/19; 380/20
[58] Field of Search .................. 380/10, 13, 15, 19, 380/20

[56] References Cited

U.S. PATENT DOCUMENTS

| | | | |
|---|---|---|---|
| 4,163,252 | 7/1979 | Mistry et al. | 380/15 |
| 4,295,155 | 10/1981 | Jarger et al. | 380/15 |
| 4,323,922 | 4/1982 | den Toonder et al. | 380/15 |
| 4,389,671 | 6/1983 | Posner et al. | 380/17 |
| 4,458,268 | 7/1984 | Ciciora | 380/15 |
| 4,471,380 | 9/1984 | Mobley | 380/15 |

FOREIGN PATENT DOCUMENTS 5851678 of 0000 Japan .

Primary Examiner—Stephen C. Buczinski
Assistant Examiner—Linda J. Wallace
Attorney, Agent, or Firm—Armstrong, Nikaido, Marmelstein, Kubovcik & Murray

[57] ABSTRACT

A television signal converter includes a CATV tuner having a channel converting function, a gain changing circuit for descrambling the output from the CATV tuner and the like, in order to convert a television signal such as a CATV signal formed by a scrambled video signal into a descrambled television signal of channel 3, for example. The descrambled channel 3 CATV signal outputted from the gain changing circuit includes noise in the reproduced audio signal since the audio carrier is influenced by gain changing. In the present invention, therefore, the audio signal is reproduced from an audio carrier extracted from the front stage of a gain changing circuit. Thus, the reproduced audio signal is released from noise caused by gain changing.

7 Claims, 5 Drawing Sheets

TELEVISION SIGNAL CONVERTER

This application is a continuation of application Ser. No. 926,613 filed Nov. 4, 1989, now abandoned.

BACKGROUND OF THE INVENTION

1. Field of the Invention

The present invention relates to a television signal converter for converting television signal input of an arbitrary channel into television signal output of a predetermined channel. More specifically, it relates to an improvement in a signal converter which receives a television signal such as a CATV signal formed by a scrambled video signal to convert the same into a descrambled television signal of a predetermined channel.

2. Description of the Prior

In countries such as U.S. and Canada, subscription television broadcasting is popularly made through developed CATV systems. A CATV system is adapted to transmit television signals of a plurality of channels from a broadcasting station to subscribers through cables such as coaxial cables. Within the transmitted television signals, those of premium programming are scrambled to prevent unauthorized viewing of the programming. Authorized subscribers for the premium programming, i.e., subscribing addressees, can descramble the scrambled television signals to watch the programming. Such a system of subscription television broadcasting is generally called a "pay per view system".

Scrambling in the CATV system or the like is generally performed by a method of compressing the amplitude of a carrier accompanied by a video signal (hereinafter referred to as "video carrier" in this specification) to convert the same, through a system such as a timing-tag system. Details of the scrambling through the timing-tag system are disclosed in, e.g., U.S. Continued Pat. No. 4,471,380 and Japanese Patent Laying-Open Gazette No. 51678/1983. In the timing-tag system, the video carrier is compressed by a prescribed level in intervals of a horizontal synchronizing signal part to be scrambled. At the same time, a frequency-modulated audio signal carrier, i.e., a carrier accompanied by an audio signal (hereinafter referred to as "audio carrier" in this specification) is amplitude-modulated by a timing-tag signal which is synchronous with the horizontal synchronizing signal part, to frequency-multiplex and transmit the amplitude-modulated audio carrier and the scrambled video carrier.

For example, U.S. Continued Pat. No. 4,323,922 discloses an example of a conventional signal converter which is applied to a receiver for the television signal scrambled through the aforementioned timing-tag system. In the conventional signal converter as disclosed in this Patent, however, the audio carrier amplitude-modulated by the timing-tag signal is influenced by gain changing following descrambling, whereby the reproduced audio signal includes noise or the like.

SUMMARY OF THE INVENTION

It is an object of the present invention to overcome the aforementioned disadvantage of the conventional signal converter, i.e., the bad influence exerted on the audio signal by descrambling, and provide a novel signal converter which can reproduce an audio signal of good quality.

In the signal converter according to the present invention, a circuit for separating an audio carrier from an input television signal is provided in the front stage of a descrambling circuit, to obtain an audio signal by directly detecting the separated audio carrier.

According to the signal converter of the present invention, therefore, the audio carrier is not passed through the descrambling circuit, whereby an audio signal of good quality can be reproduced with no bad influence exerted by the descrambling circuit.

These and other objects, features, aspects and advantages of the present invention will become more apparent from the following detailed description of the present invention when taken in conjunction with the accompanying drawings.

DESCRIPTION OF THE RELATED ART AND OF THE PREFERRED EMBODIMENTS

The following description is made with reference to a signal converter required for a CATV signal addressee in a CATV broadcasting system according to an embodiment of the present invention.

In order to clarify the points of this embodiment, description is now made of a related art.

Figure 1:
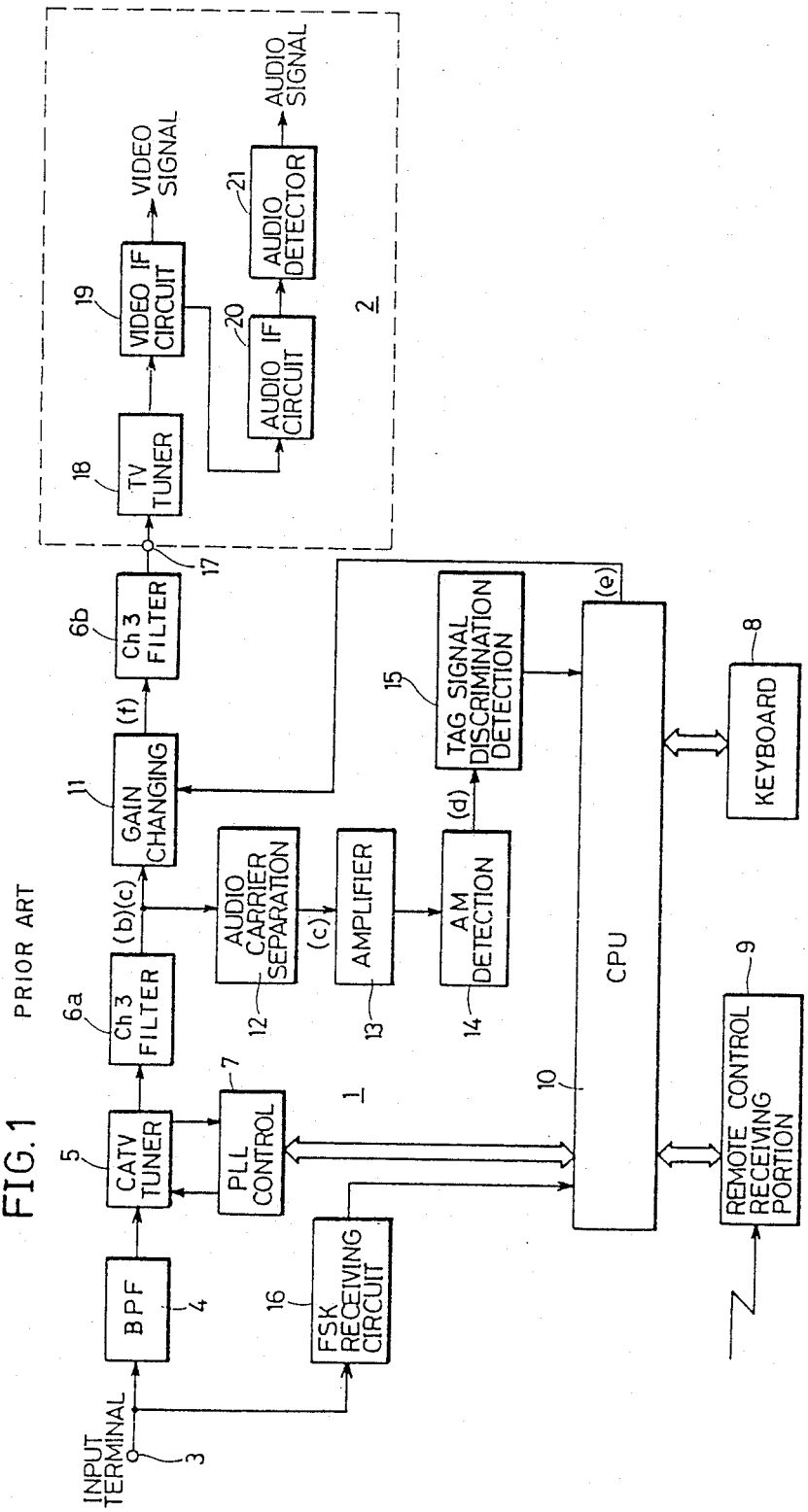
FIG. 1 is a block diagram showing a related system of the present invention, illustrating a signal converter 1 which can convert a descrambled CATV signal into a channel 3 descrambled television signal and a part of a television receiver 2.

Referring to FIG. 1 showing a block diagram of a related system of the present invention, CATV signals transmitted from a broadcasting station through a coaxial cable (not shown) are supplied to an input terminal 3 of a signal converter 1. The CATV signals include television signals of channels 02 to 75 in the U.S., for example. The following description is made on the premise that the CATV signals include frequency-multiplexed video signals and audio signals, which video signals are scrambled by amplitude compression through the timing-tag system as hereinabove described to prevent unauthorized reception of premium programming and audio signals are amplitude-modulated by descrambling signals.

The CATV signals received in the input terminal 3 are supplied to a CATV tuner 5 through a bandpass filter 4. The bandpass filter 4 is adapted to pass signals in the frequency band for CATV broadcasting such as those of channels 02 to 75 in the U.S. for example, thereby to cut off signals other than the CATV signals. The CATV tuner 5 is adapted to select a prescribed receiving channel such as channel 58 and convert the channel 58 signal as received into a channel 3 signal.

In further detail, a subscriber using the signal converter 1 operates a keyboard 8 or a remote control transmitter (not shown) to select a desired channel such as the channel 58. In response to this, the keyboard 8 or a remote control signal receiving portion 9 outputs a signal indicating selection of the channel 58 to a CPU 10. The CPU 10 in turn controls a PLL control circuit 7 to receive the signal of the selected channel 58, and the PLL circuit 7 controls the local oscillation frequency of the CATV tuner 5 to correspond to the channel 58 as selected by the CPU 10. Thus, the signal of the CATV channel, e.g., channel 58 signal selected by the subscriber is received by the CATV tuner 5, to be converted into a channel 3 signal.

The converted channel 3 TV signal outputted from the CATV tuner 5 is subjected to elimination of unnecessary components by a channel 3 filter 6a, to be supplied to a gain changing circuit 11 as well as input to an audio carrier separation filter 12.

Figure 3:
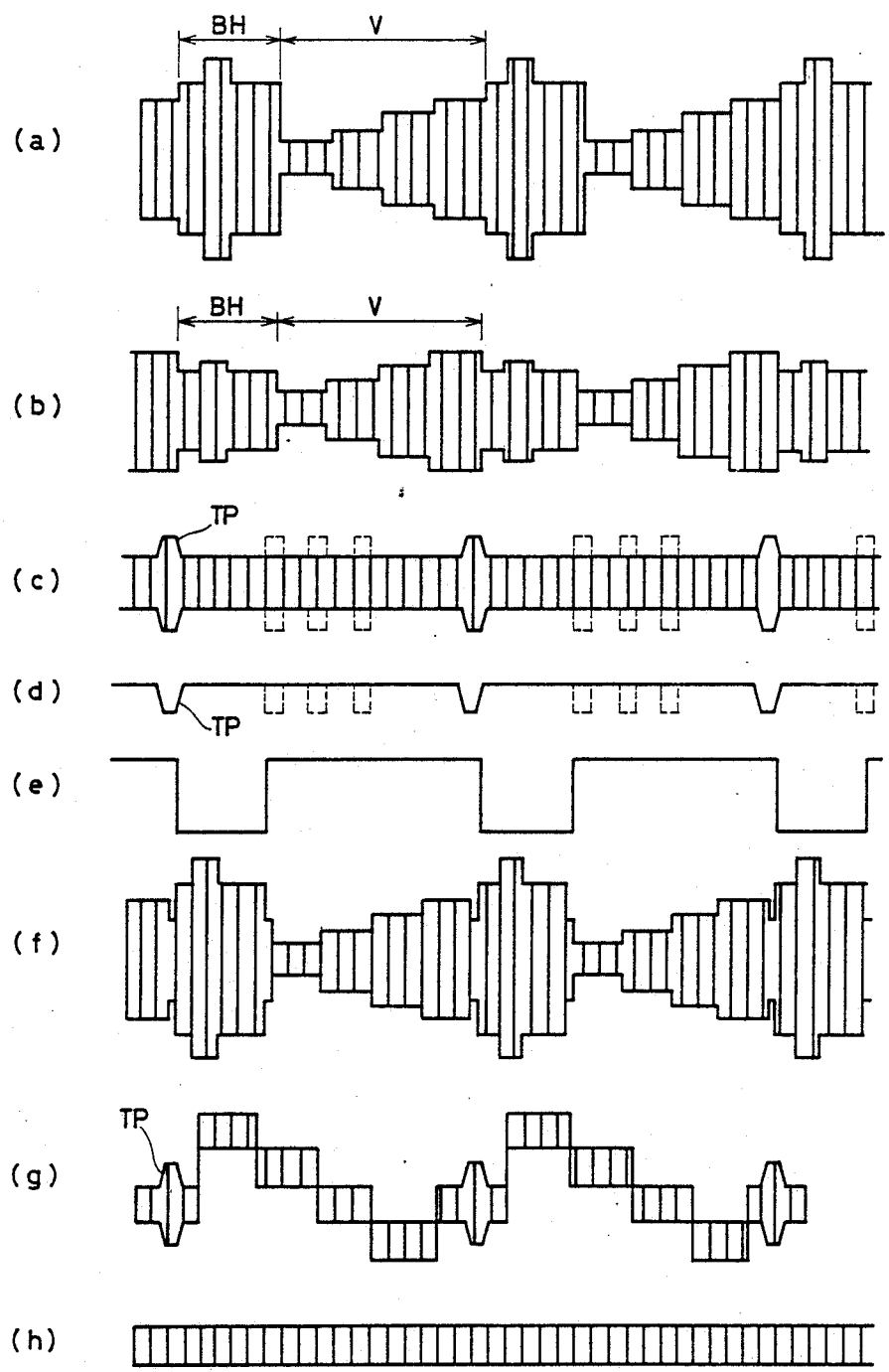
FIG. 3 illustrates signal waveforms in respective parts of the related system of the present invention as shown in FIG. 1 and the embodiment of the present invention as shown in FIG. 2.

The channel 3 TV signal outputted from the channel 3 filter 6a includes frequency-multiplexed video carrier and audio carrier. The video carrier is in the form of a signal as shown at FIG. 3(b) and the audio carrier is in the form of a signal as shown at FIG. 3(c). Namely, the video carrier included in the channel 3 TV signal is such a signal that horizontal blanking intervals BH are compressed and horizontal scanning intervals V are uncompressed with respect to the normal video carrier as shown at FIG. 3(a), to be scrambled by amplitude compression. The audio carrier is amplitude-modulated by a timing-tag signal TP indicating beginning ends of the horizontal blanking intervals BH of the video carrier, which timing-tag signal TP is employed for descrambling.

The audio carrier separation filter 12 separates the audio carrier from the frequency-multiplexed channel 3 TV signal. Namely, the audio carrier separation filter 12 outputs the audio carrier as shown at FIG. 3(c). The audio carrier is amplified by an amplifier 13 and detected by an AM detection circuit 14, to be turned into a signal as shown at FIG. 3(d). A tag signal discrimination detection circuit 15, which receives the output from the AM detection circuit 14, is adapted to discriminate and detect a tag signal from the output of the AM detection circuit 14. In the above description, the tag signal includes only tag pulses indicating the beginning ends of the horizontal blanking intervals BH for convenience of illustration, while the same may include other tag pulses as indicated by broken lines, such as those for identifying programming and those indicating presence/absence of a subaudio signal.

On the other hand, the CPU 10 is also supplied with addressable data received in and demodulated by a frequency shift key (FSK) receiving circuit 16. The addressable data accompany with an FSK signal continuously transmitted in a frequency band different from that of the CATV signal, and include, for example, channel data, subscribed programming data, ID data for identifying the subscriber and the like. More concretely, the addressable data received in and demodulated by the FSK receiving circuit 16 include data on subscribed programming, such that programs on channels 20, 58 and 61 are subscribed.

On the basis of the signal from the tag signal discrimination detection circuit 15 and the FSK receiving circuit 16, the CPU 10 determines whether or not the program on the channel currently received by the CATV tuner 5 is to be descrambled. If the determination is of yes, the CPU 10 derives a descrambling signal for a gain changing circuit 11. The descrambling signal includes pulses synchronous with the horizontal blanking intervals BH of the video carrier, as shown at FIG. 3(e). The gain changing circuit 11 changes the gains in response to low and high levels of the descrambling signal as shown at FIG. 3(e), thereby to increase the gains of the horizontal blanking intervals BH of the inputted video carrier by those compressed by scrambling. As the result, the video carrier outputted from the gain changing circuit 11 is descrambled as shown at FIG. 3(f).

The channel 3 TV signal including the video carrier thus descrambled by the gain changing circuit 11 and the audio carrier frequency-multiplexed therewith is supplied to an RF input terminal 17 of a television receiver 2 through the channel 3 filter 6b provided in the subsequent stage.

In the television receiver 2, the channel 3 TV signal including the video carrier and the audio carrier for the channel 3 is converted into an intermediate frequency signal by a TV tuner 18 set in a position of the channel 3. The video intermediate frequency signal is detected by a video intermediate frequency circuit 19 to be turned into a video signal, which is transmitted to a video signal circuit system (not shown) in the television receiver 2. At the same time, the output of the video intermediate frequency circuit 19 is partially inputted in an audio intermediate frequency circuit 20 to be converted into an audio intermediate frequency signal of intercarrier frequency and subjected to elimination of the components amplitude-modulated through the aforementioned timing-tag signal or the like by a limiter circuit contained in the receiver, thereby to be FM-detected by an audio detector circuit 21 for reproduction of the audio signal.

In the circuit system of the aforementioned related system of the present invention, however, the audio carrier supplied to the RF input terminal 17 of the television receiver 2 is subjected to gain changing with the video carrier in the gain changing circuit 11 by the descrambling signal, to be passed through the channel 3 filter 6b in the rear stage thereof. In case where the gain changing circuit 11 and the channel 3 filter 6b in the rear stage thereof are not in ideal frequency characteristics with respect to the amplitude-modulated audio carrier, i.e., when the frequency characteristics of the gain changing circuit 11 and the channel 3 filter 6b are not horizontally symmetrical about the frequency of the audio carrier, the audio signal component is influenced by gain changing. This is because gain changing is a sort of amplitude modulation, whereby upper and lower sideband wave signals of amplitude modulation are differed in amplitude when the frequency characteristics of the gain changing circuit 11 and the channel 3 filter 6b are not horizontally symmetrical about the frequency of the audio carrier such that the amplitude difference component serves as phase modulation component for the frequency of the audio carrier to appear as noise or the like. Such influence by the gain changing significantly disturbs reproduction of the audio signal in good quality. The present invention has been completed in the aforementioned background.

Figure 2:
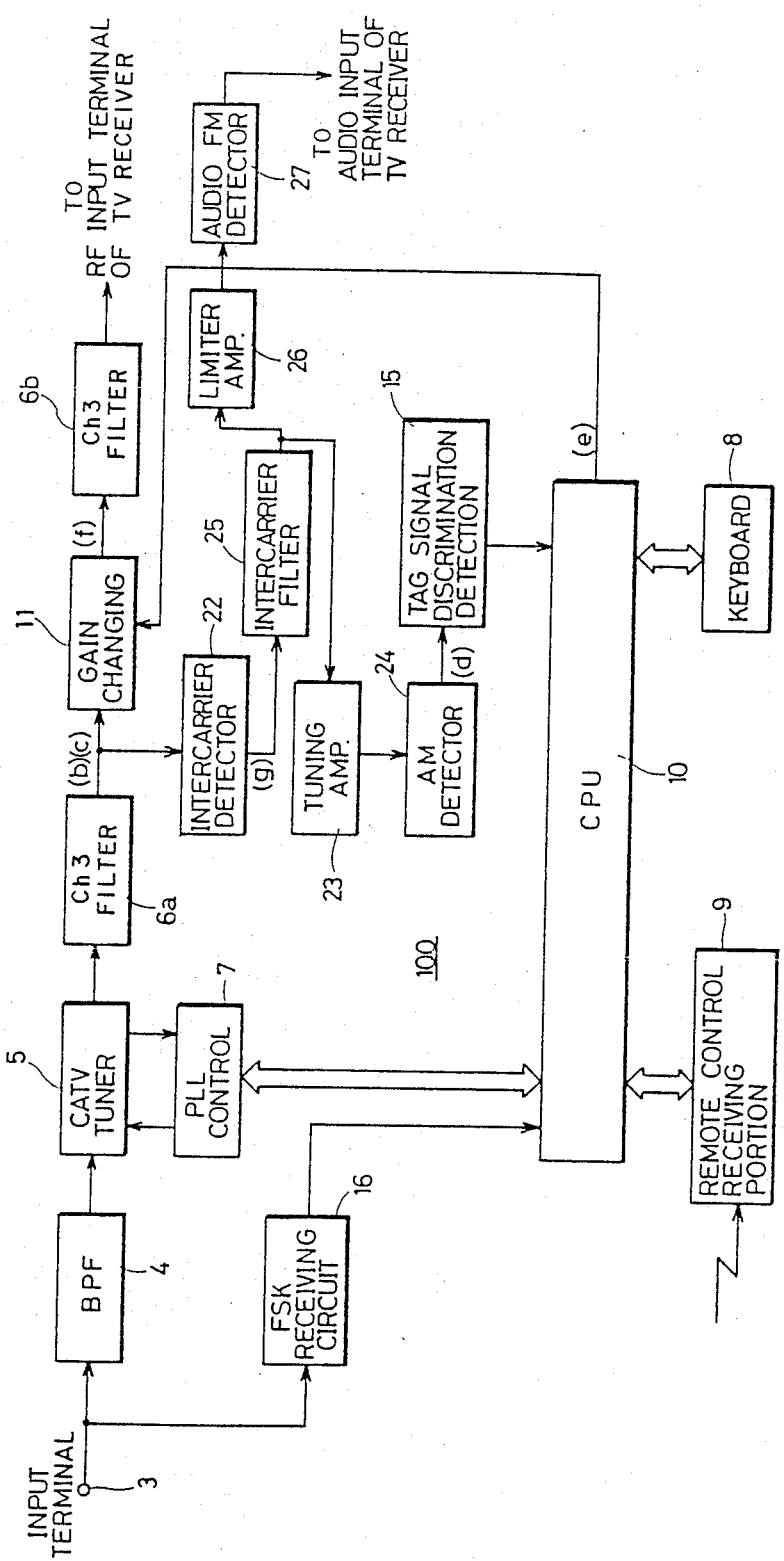
FIG. 2 is a block diagram showing the structure of a CATV signal converter according to an embodiment of the present invention.

With reference to FIG. 2, description is now made on a signal converter 100 for receiving a CATV signal according to an embodiment of the present invention. Referring to FIG. 2, parts identical in circuit structure to those of the related art as shown in FIG. 1 are indicated by the same reference numerals, and descriptions thereof are omitted.

The embodiment of the present invention as shown in FIG. 2 has the following features: First, an intercarrier detector circuit 22 is provided to receive the output signal from a channel 3 filter 6a the front stage so that the output signal of the detector circuit 22 is guided to an AM detector circuit 24 through an intercarrier filter 25 and a tuning amplifier 23. Second, the output signal from the intercarrier filter 25 is introduced in a limiter amplifier 26, whose output signal is supplied to an FM demodulation type audio detector circuit 27, so that the reproduced audio signal outputted from the audio detector circuit 27 is supplied to an audio input terminal of a television receiver (not shown). As the result, only a video carrier of a channel 3 TV signal supplied to an RF input terminal of the television receiver from the channel 3 filter 6b of the rear stage is used while an audio carrier is not used. Other structure of this embodiment is similar to that of the system as shown in FIG. 1.

According to the embodiment as shown in FIG. 2, therefore, intercarrier detection is performed by the intercarrier detector circuit 22, whereby an intercarrier signal is obtained corresponding to frequency difference between an audio carrier amplitude-modulated by a timing tag signal and a scrambled video carrier, i.e., a signal of 4.5 MHz in the U.S. CATV system for example, as shown at FIG. 3(g). This signal is passed through the intercarrier filter 25 to be turned into that as shown at FIG. 3(c). This signal is amplified by the tuning amplifier 23 and detected by an AM detector circuit 24 operating in the intercarrier band, thereby to obtain the timing-tag signal as shown at FIG. 3(d).

An intercarrier signal as shown at FIG. 3(c) outputted from the intercarrier filter 25 is supplied to the limit amplifier 26 to be turned into a signal as shown at FIG. 3(h) through elimination of components amplitude-modulated by the timing-tag signal, and inputted in the audio detector circuit 27. Therefore, the audio detector circuit 27 outputs an audio signal of good quality including no component phase-modulated by a gain changing circuit 11.

Figure 4:
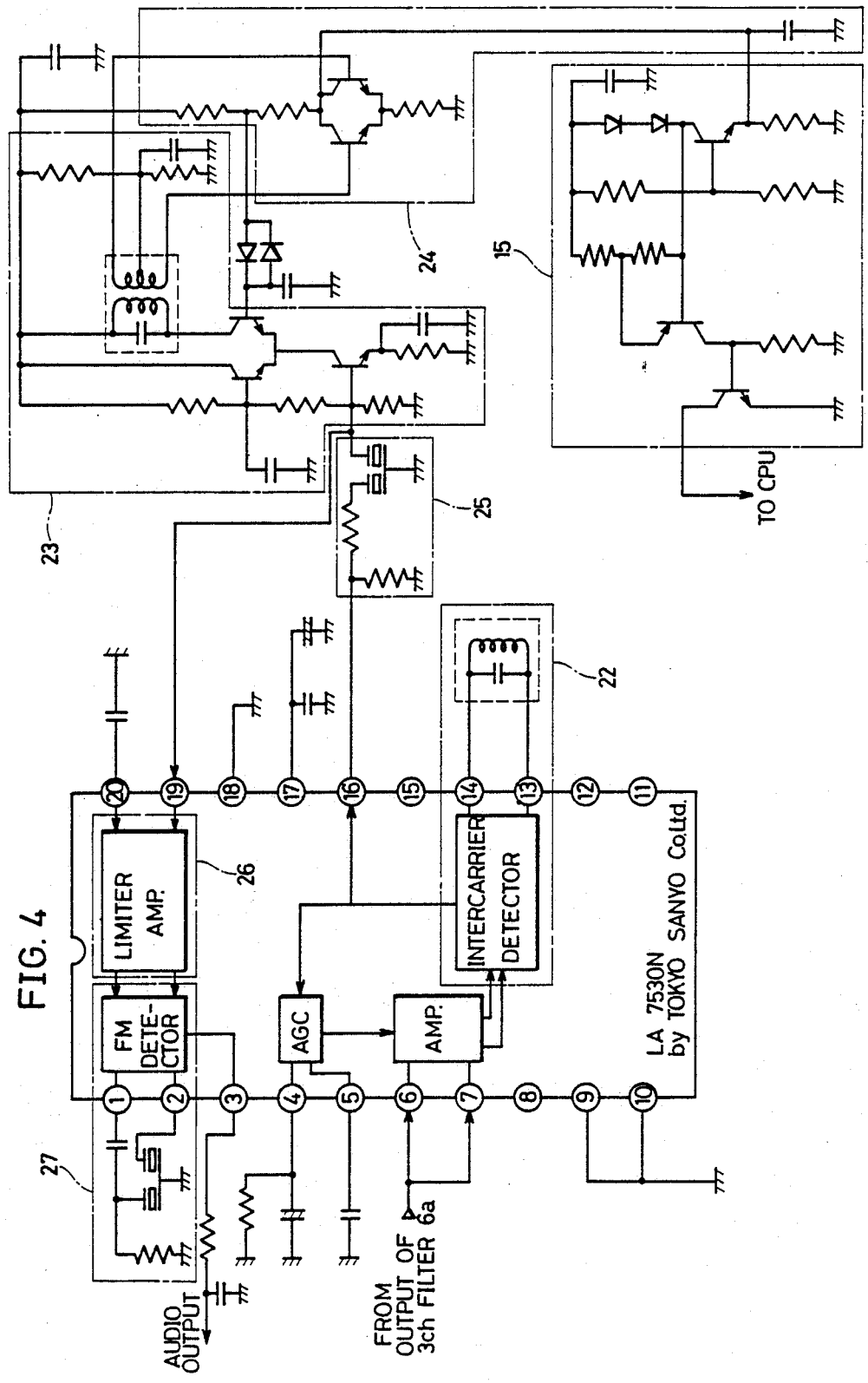
FIG. 4 is a circuit diagram showing definite structure of the CATV signal converter according to the present invention as shown in FIG. 2.

FIG. 4 is a circuit diagram showing an example of definite structure of a characteristic part of the converter 100 according to the embodiment of the present invention as shown in FIG. 2. As shown in FIG. 4, an intercarrier detector circuit 22, a limit amplifier 26 and an audio detector circuit 27 can be implemented by integrated circuits of product No. LA7530N by Tokyo Sanyo Co., Ltd., for example. In the circuit as shown in FIG. 4, parts corresponding to respective blocks of FIG. 2 are indicated by the same reference numerals. Modes of definite connection etc. of this circuit are obvious from FIG. 4, and hence description thereof is omitted.

Figure 5:
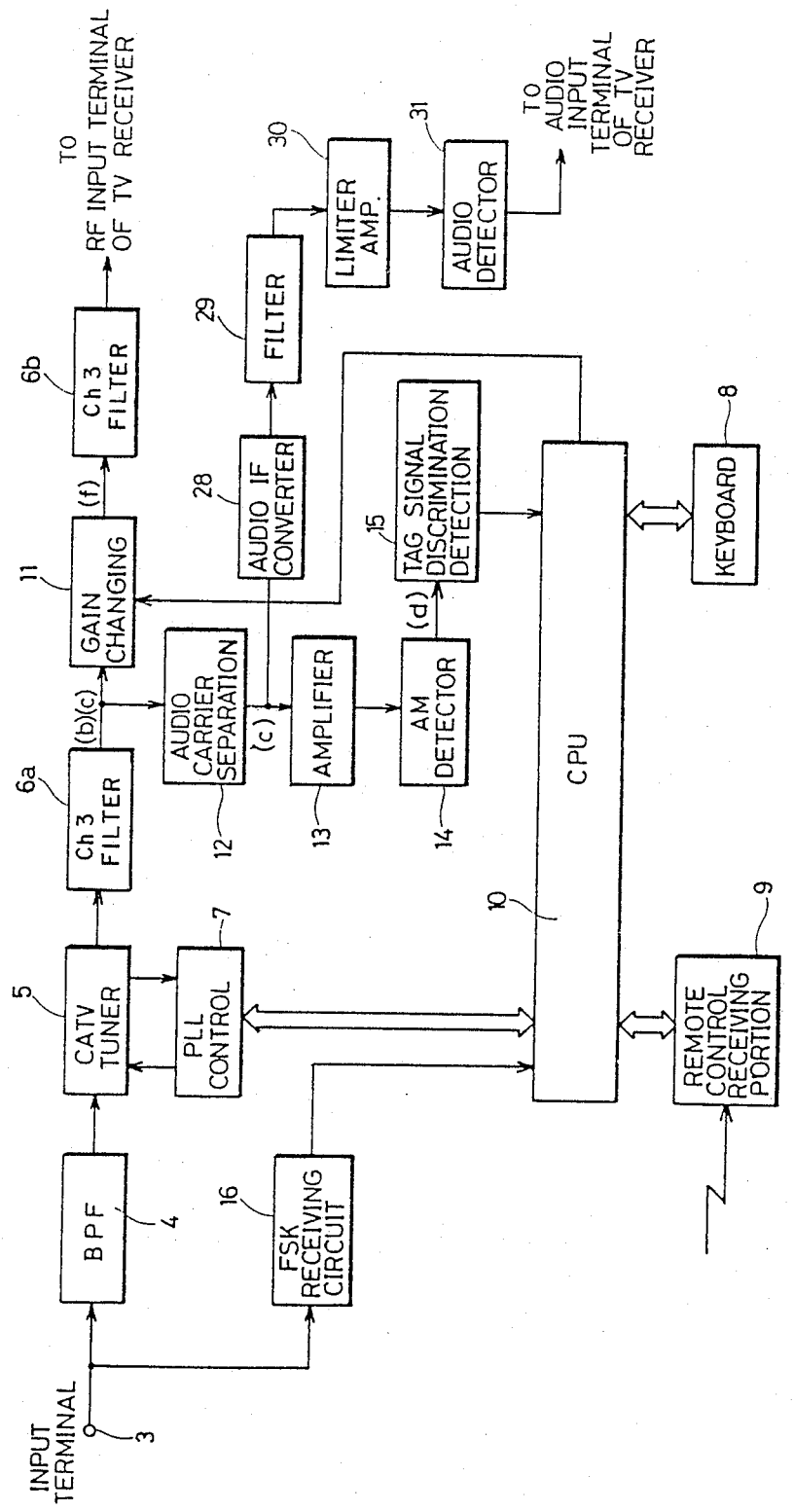
FIG. 5 is a block diagram showing the structure of a CATV signal converter according to another embodiment of the present invention.

FIG. 5 is a block diagram showing another embodiment of the present invention. This embodiment has the following feature: The output from an audio carrier separation circuit 12 for separating an audio carrier from the output signal of a channel 3 filter 6a in the front stage is inputted in an audio intermediate frequency circuit 28 so that the audio carrier of, e.g., 65.75 MHz is converted into n audio intermediate frequency signal by the audio intermediate frequency circuit 28. The audio intermediate frequency signal is subjected to noise elimination by a filter 29 and amplified by a limit amplifier 30 with elimination of components amplitude-modulated by a timing-tag signal or the like, to be FM-detected by a detector circuit 31 thereby to obtain an audio signal. The audio signal obtained by the detector circuit 31 is supplied to an audio signal input terminal of a television receiver (not shown). Other structure of this embodiment is similar to the related system of the present invention as shown in FIG. 1, and identical parts are indicated by the same reference numerals.

According to the embodiment as shown in FIG. 5, the audio signal is obtained in the detector circuit 31 by converting the output from the audio carrier separation circuit 12 into an audio intermediate frequency signal and eliminating components amplitude-modulated by the timing tag signal etc. by the limit amplifier 30. Thus, the audio signal obtained as the output of the detector circuit 31 is with no influence by a gain changing circuit 11 and the channel 3 filter 6b.

Although the above description has been made with reference to a signal converter for receiving the signal of a CATV system, the present invention can be widely applied to such case where video carrier components of an inputted television signal are modulated and it is desired to reproduce an audio signal of good quality by protecting the output audio signal against influence by gain changing for restoring the said modulation of the video carrier or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television signal converter for selecting a television signal of an arbitrary channel out of television input signals from a plurality of channels and for converting the selected television signal of said arbitrary channel into a television output signal of a predetermined channel, each of said television input signals having a video carrier and an audio carrier, said video carrier being subjected to amplitude modulation by a video signal, to be scrambled by compressing horizontal synchronizing signal portions of said amplitude modulated video carrier by a prescribed level, while said audio carrier is subjected to frequency modulation by an audio signal and is subjected to amplitude modulation by a descrambling signal required for descrambling said scrambled video carrier, both said scrambled video carrier and said amplitude modulated audio carrier being frequency-multiplexed with each other to be transmitted as at least one of said television input signals, said television signal converter comprising:

selecting means for selecting said television signal of said arbitrary channel out of said television input signals of said plurality of channels;

converting means for converting said television signal of said arbitrary channel selected by said selecting means to said television signal of said predetermined channel;

descrambling means for descrambling said predetermined channel television signal outputted from said converting means by expanding horizontal synchronizing signal portions of said predetermined channel television signal by a prescribed level;

filter means operably connected to an output of said descrambling means for passing only said predetermined channel television signal;

audio carrier extracting means for extracting said television signal before being descrambled by said descrambling means and for extracting said audio carrier, having been subjected to frequency modulation by said audio signal and having been subjected to amplitude modulation, from said television signal before being descrambled;

FM demodulation means for FM demodulating said audio carrier extracted by said audio carrier extracting means in order to reproduce said audio signal;

descrambling signal detecting means for AM detecting said audio carrier extracted by said audio carrier extracting means in order to detect said descrambling signal; and control means for controlling said descrambling means in response to said descrambling signal detected by said descrambling signal detecting means, to thereby avoid unnecessarily subjecting said audio carrier to phase modulation when said scrambled television signal with said compressed horizontal synchronizing signal portion is descrambled by said descrambling means by expanding said horizontal synchronizing signal portion.

2. A television signal converter in accordance with claim 1, further comprising tuner means, provided in the front stage of said descrambling means, for selecting said television signal of an arbitrary channel from supplied television signals of a plurality of channels and for outputting said television signal of the arbitrary channel.

3. A television signal converter in accordance with claim 1, wherein
said descrambling means performs a descrambling operation in response to said descrambling signal detected by said descrambling signal detecting means.

4. A television signal converter in accordance with claim 3, wherein
scrambling for compressing the amplitude of specific intervals of said video carrier is employed as said scrambling, and
said descrambling signal includes timing-tag pulses indicating said specific intervals in which the amplitude of said video carrier is compressed.

5. A television signal converter in accordance with claim 1, wherein
said audio carrier extracting means includes intercarrier detecting means for performing intercarrier detection of said video carrier and said audio carrier.

6. A television signal converter in accordance with claim 1, wherein
said audio carrier extracting means includes filter means for passing only said audio carrier.

7. A signal converter for receiving CATV signals employable for a CATV broadcasting system, said CATV signals being formed by those of a plurality of channels different in frequency band from each other and including video carriers accompanied by video signals and audio carriers accompanied by audio signals, the video carrier of an arbitrary CATV signal within said CATV signals of said plurality of channels being scrambled by amplitude compression and said audio carrier being subjected to amplitude modulation by a descrambling signal required for descrambling said video carrier, said signal converter comprising:

tuner means receiving said CATV signals, said tuner means selecting said CATV signal of an arbitrary channel from said supplied CATV signals of said plurality of channels and for outputting said CATV signal of the arbitrary channel;

conversion means connected in the output side of said tuner means for converting said CATV signal of said prescribed channel selected by said tuner means into a CATV signal of a predetermined channel;

extracting means connected in the output side of said conversion means for extracting an audio carrier from said converted CATV signal of said predetermined channel;

detection means for detecting said descrambling signal from said audio carrier outputted from said extracting means;

descrambling means connected in the output side of said conversion means for performing descrambling in response to said descrambling signal detected by said detecting means when said converted CATV signal of said specific channel is a scrambled signal; and audio signal reproducing means connected in the output side of said extracting means for reproducing an audio signal from said extracted audio carrier.

* * * * *